(12) United States Patent
Moje et al.

(10) Patent No.: US 9,428,274 B2
(45) Date of Patent: Aug. 30, 2016

(54) EXPANDABLE AIRCRAFT MONUMENT (71) Applicant: Airbus Operations GmbH, Hamburg (DE)

(72) Inventors: Sabrina Moje, Rosengarten (DE); Matthias Breuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 86 days.

(21) Appl. No.: 14/278,310

(22) Filed: May 15, 2014

(65) Prior Publication Data
US 2014/0339363 A1 Nov. 20, 2014

(30) Foreign Application Priority Data

May 15, 2013 (DE) ........................ 10 2013 008 291

(51) Int. Cl.
| | | |
|---|---|---|
| B64D 11/00 | (2006.01) | |
| B64D 11/02 | (2006.01) | |
| B64D 11/04 | (2006.01) | |
| B64C 1/14 | (2006.01) | |

(52) U.S. Cl.
CPC ............ B64D 11/00 (2013.01); B64C 1/1423 (2013.01); B64D 11/0023 (2013.01); B64D 11/02 (2013.01); B64D 11/04 (2013.01)

(58) Field of Classification Search
CPC ... B64D 11/00; B64D 11/0023; B64D 11/02; B64D 11/04
USPC ....................................................... 244/118.5
See application file for complete search history.

(56) References Cited

U.S. PATENT DOCUMENTS 882,760 A * 3/1908 Hubert ................ A47B 83/001
4/630
(Continued)

FOREIGN PATENT DOCUMENTS

| DE | 102006023047 | 11/2007 |
|---|---|---|
| DE | 102010012989 | 9/2011 |
| DE | 102011109390 | 2/2013 |
| EP | 0867365 | 9/1998 |
| WO | 2011116982 | 9/2011 |

(Continued)

OTHER PUBLICATIONS

German Search Report, May 15, 2013.

Primary Examiner — Timothy D Collins
Assistant Examiner — Richard G Davis
(74) Attorney, Agent, or Firm — Greer, Burns & Crain Ltd.

(57) ABSTRACT

An aircraft monument for installation in an aircraft cabin including a first functional module, the first functional module including a side wall for delimiting the first functional module from a region of the aircraft cabin adjacent to the first functional module and/or from a region of the aircraft monument adjacent to the first functional module. The side wall is movable between a first and a second operational position and comprises a side-wall region which merely in the second operational position of the side wall serves for delimiting the first functional module from a region of the aircraft cabin adjacent to the first functional module, so that a movement of the side wall out of its first operational position into its second operational position results in an enlargement of a base area of the first functional module.

16 Claims, 7 Drawing Sheets

(56) References Cited

U.S. PATENT DOCUMENTS

| | | |
|---|---|---|
| 2,650,368 A | 9/1953 | Evans |
| 6,079,669 A * | 6/2000 | Hanay .................. B64D 11/02 244/118.5 |
| 7,780,114 B2 | 8/2010 | Doebertin et al. |
| 8,720,827 B2 * | 5/2014 | Boren .................. B64D 11/02 160/210 |
| 2009/0261200 A1 * | 10/2009 | Saint-Jalmes .......... B64D 11/04 244/118.5 |
| 2013/0082140 A1 | 4/2013 | Ehlers et al. |

FOREIGN PATENT DOCUMENTS

| | | |
|---|---|---|
| WO | 2013017290 | 2/2013 |
| WO | 2013123075 | 8/2013 |

* cited by examiner

EXPANDABLE AIRCRAFT MONUMENT

CROSS-REFERENCES TO RELATED APPLICATIONS

This application claims the benefit of the German patent application No. 10 2013 008 291.9 filed on May 15, 2013, the entire disclosures of which are incorporated herein by way of reference.

BACKGROUND OF THE INVENTION

The invention relates to an aircraft monument provided for installation in an aircraft cabin, and also to an aircraft region including an aircraft monument of such a type. The invention further relates to a process for operating an aircraft equipped with an aircraft monument of such a type and/or with an aircraft region of such a type.

Modern commercial aircraft are ordinarily equipped with on-board kitchens, so-called galleys, which are known, for example, from DE 10 2006 023 047 B4 or U.S. Pat. No. 7,780,114 B2. As a rule, the galleys are installed in the door-entry regions of the aircraft cabin and comprise a body with a substantially rectangular outline, which is oriented parallel to a door aisle extending in the direction of an aircraft door. Via the door aisle, which extends substantially perpendicular to a main aisle running along a longitudinal axis of the aircraft cabin, passengers can get out of the aircraft or into the aircraft.

Furthermore, from DE 10 2011 109 390 A1 or WO 2013/017290 A1 an aircraft monument for installation in an aircraft cabin is known which comprises a sanitary module with a sanitary device and also a kitchen module arranged adjacent to the sanitary module. The kitchen module comprises a trolley parking space and also a working surface, the trolley parking space being separated from the sanitary module by a partition. The aircraft monument described in DE 10 2011 109 390 A1 or WO 2013/017290 A1 enables the installation space requirement of an on-board kitchen in an aircraft cabin to be diminished without impeding the handling of trolleys filled with service products for the cabin personnel, and is, in particular, suitable for installation in aircraft that are employed on short-haul flights pertaining to the lower price range, on which merely a reduced service is offered to the passengers.

Lastly, DE 10 2010 012 989 A1 or WO 2011/116982 A2 proposes to equip a sanitary module, provided for installation in an aircraft cabin, in its interior space with a first trolley parking place for accommodating at least one trolley that is suitable for receiving supplies for the passengers in the aircraft cabin, in the interior space of the sanitary module. Furthermore, a second trolley parking place is provided adjacent to the sanitary module. During take-off and during landing, i.e., during the flight phases in which the sanitary module is not available to the passengers for use anyway for reasons of safety, the first trolley parking place in the interior space of the sanitary module can be utilized for accommodating one or more trolleys in the interior space of the sanitary module. If the aircraft is, on the other hand, at cruising altitude, the second trolley parking place is available for accommodating the trolley(s).

SUMMARY OF THE INVENTION

An object underlying the invention is to specify an aircraft monument that enables an optimal exploitation of the space available in an aircraft cabin in various operational phases of the aircraft. Furthermore, an object underlying the invention is to make available an aircraft region equipped with an aircraft monument of such a type. Lastly, the invention is directed towards an object of specifying a process for operating an aircraft equipped with an aircraft monument of such a type and/or with an aircraft region of such a type.

An aircraft monument provided for installation in an aircraft cabin includes a first functional module. The first functional module is equipped with a side wall that is adapted to delimit the first functional module from a region of the aircraft cabin adjacent to the first functional module and/or from a region of the aircraft monument adjacent to the first functional module. By virtue of the side wall of the first functional module, a base area of the first functional module is consequently defined. The side wall is movable between a first and a second operational position and comprises a side-wall region that merely in the second operational position of the side wall serves for delimiting the first functional module from a region of the aircraft cabin adjacent to the first functional module. If the side wall is in its first operational position, the side-wall region is, on the other hand, arranged inside or outside the first functional module in such a way that it is not suitable for delimiting the first functional module from a region of the aircraft cabin adjacent to the first functional module. By virtue of this configuration of the side wall of the first functional module, a movement of the side wall out of its first operational position into its second operational position results in an enlargement of a base area of the first functional module.

The aircraft monument consequently includes a first functional module, the base area of which can, as needed, be varied in straightforward manner by movement of the side wall of the first functional module. In operational phases of the aircraft in which, for example for reasons of comfort, a larger base area of the functional module is desired, the functional module can consequently be utilized with its larger base area. On the other hand, in operational phases of the aircraft in which, for example for reasons of safety, regions of the aircraft cabin that are as large as possible are to remain vacant, a utilization of the first functional module with diminished base area is possible. The aircraft monument consequently enables an optimal exploitation of the space available in the aircraft cabin in various operational phases of the aircraft.

In principle, the first functional module of the aircraft monument may be designed in the form of an arbitrary module, for example a kitchen module or a stowage-compartment module. However, the first functional module preferably is configured in the form of a sanitary module. The sanitary module may be equipped with a toilet and also with further sanitary devices such as, for example, a washbasin with a water tap, a mirror and/or a cupboard for accommodating toilet paper, paper towels etc.

The first functional module may comprise a substantially circular, square or rectangular base area. Preferably, however, the first functional module has a tapering base area. In particular, the first functional module may comprise a circular-segment-shaped base area.

The side wall of the first functional module may be movable between its first and its second operational position by swinging, rotating, displacement or another suitable motion. It is merely essential that the movement of the side wall out of its first operational position into its second operational position has the effect that the side-wall region that in the first operational position of the side wall is not suitable for delimiting the first functional module from a region of the aircraft cabin adjacent to the first functional module gets into a position in which it delimits at least a partial region of the first functional module from a region of the aircraft cabin adjacent to the first functional module, so that the movement of the side wall out of its first operational position into its second operational position results in an enlargement of a base area of the first functional module.

Preferably, however, the side wall of the first functional module is movable between its first and its second operational position by swiveling of at least a portion of the side wall about a swivel axis. A side wall that is capable of being swiveled about a swivel axis can be configured with a minimal number of moving parts and is therefore easy to manufacture, low-maintenance and largely insusceptible to faults. Furthermore, a lightweight design of the side wall and also of the swivel axis and hence of the functional module is possible.

The swivel axis may be arranged in the region of a vertex of the tapering base area of the first functional module. Such an arrangement of the swivel axis presents itself, in particular, when the first functional module comprises a circular-segment-shaped base area. By swiveling of the side wall of the first functional module out of its first operational position into its second operational position, the base area of the first functional module can then be enlarged while retaining its circular-segment shape. The swivel axis may be anchored in the region of a floor of the first functional module and/or in a floor of the aircraft cabin.

In the side wall of the first functional module a doorway that is capable of being closed by a door may be formed, in order to make the interior space of the first functional module accessible. The door may be designed in the form of a sliding door or may be capable of being swiveled between an open position and a closed position about a swivel axis. The swivel axis of the door preferably is arranged in the region of a vertex of the tapering base area of the first functional module. In other words, the side wall of the first functional module and the door that serves to clear or to close the doorway formed in the side wall of the first functional module may be capable of being swiveled about a common swivel axis. This design enables a fashioning of the first functional module with particularly few component parts, and a particularly lightweight configuration of the first functional module.

The side-wall region of the side wall of the first functional module that merely in the second operational position of the side wall serves for delimiting the first functional module from a region of the aircraft cabin adjacent to the first functional module may, for example, be designed in the form of a segment of an outer cylindrical surface. If the side wall of the first functional module is in its second operational position, the side-wall region can then serve for expansion of a further side-wall region of the side wall of the first functional module, which may likewise be designed in the form of a segment of an outer cylindrical surface. The further side-wall region of the side wall of the first functional module may, for example, in particular irrespective of the operational position of the side wall, serve for delimiting the first functional module from a region of the aircraft monument adjacent to the first functional module.

The side-wall region of the side wall of the first functional module that merely in the second operational position of the side wall serves for delimiting the first functional module from a region of the aircraft cabin adjacent to the first functional module in the first operational position of the side wall preferably is arranged adjacent to the further side-wall region of the side wall of the first functional module, which the side-wall region that merely in the second operational position of the side wall serves for delimiting the first functional module from a region of the aircraft cabin adjacent to the first functional module expands in the second operational position of the side-wall. The side-wall region that merely in the second operational position of the side wall serves for delimiting the first functional module from a region of the aircraft cabin adjacent to the first functional module preferably is arranged immediately adjacent to the further side-wall region in the first operational position of the side wall, so that in the first operational position of the side wall the side-wall region has only a small space requirement.

In particular, the side-wall region that merely in the second operational position of the side wall serves for delimiting the first functional module from a region of the aircraft cabin adjacent to the first functional module may extend in the first operational position of the side wall substantially parallel to the further side-wall region. In this case the side-wall region that merely in the second operational position of the side wall serves for delimiting the first functional module from a region of the aircraft cabin adjacent to the first functional module may in the first operational position of the side wall be arranged in an interior space of the first functional module or outside the first functional module. The first functional module may be equipped with a connecting arrangement, designed for example in the form of a suitable latching arrangement, which serves in the second operational position of the side wall to establish a connection between the side-wall region and the further side-wall region expanded in the second operational position of the side wall by the side-wall region.

In a preferred embodiment, the aircraft monument includes a plurality of first functional modules, i.e., a plurality of functional modules that serve for the same function as the first functional module. If the first functional module is designed in the form of a sanitary module, the aircraft monument may accordingly include a plurality of sanitary modules. Furthermore, the aircraft monument may include at least one further functional module serving for a function different from that of the first functional module. If the first functional module is designed in the form of a sanitary module, the further functional module may accordingly, for example, be constructed in the form of a kitchen module or a stowage-compartment module.

For example, two first functional modules may be arranged in the region of portions of the aircraft monument situated substantially opposite one another. The two first functional modules may be separated from one another by a further functional module, constructed for example in the form of a kitchen module or a stowage-compartment module. The combination of various modalities in a single aircraft monument enables a centralization of systems, for example the centralization of supply systems needed for supplying the aircraft monument. As a result, an autarkic aircraft monument can be realized, in which the various functional regions can be connected up, for example via common ports, to a central water-supply system, a central power-supply system and/or a central sewage-disposal system of the aircraft.

In a particularly preferred embodiment, the aircraft monument includes four first functional modules, each being designed in the form of a sanitary module, two of which in each instance may be arranged side by side in the region of portions of the aircraft monument situated substantially opposite one another. The two pairs of first functional modules may be separated from one another by a centrally arranged further functional module designed in the form of a kitchen module. In general, two first functional modules which form a pair of first functional modules may be arranged adjacent to each other. It is, however, also conceivable that the two first functional modules which form a pair of first functional modules are arranged side by side, but separated from each other by a portion of the centrally arranged further functional module or another functional module. The base areas of the first functional modules preferably are selected in such a way that the first functional modules each designed in the form of a sanitary module can be utilized also when the side wall of the first functional modules is in its first operational position. A greater ease of use is, however, obtained by virtue of the enlarged base area when the side wall of the first functional modules is in its second operational position.

If the side wall of the first functional modules is in its first operational position, the base areas of the first functional modules and of the central further functional module preferably are arranged in such a way that the base areas of the first functional modules, which in particular are circular-segment-shaped, do not project beyond the base area of the further functional module but rather, starting from a region adjacent to the further functional module, taper in a direction turned away from the further functional module. If the side wall of the first functional modules is, on the other hand, in its second operational position, the base areas of the first functional modules may project beyond the base area of the central further functional module, preferably in a direction perpendicular to a longitudinal axis of the aircraft monument. As a result, the first functional modules or the side walls thereof may form a privacy screen for a region situated between the two pairs of functional modules, which for example may serve as working area for the flight attendants while utilizing the further functional module designed in the form of a kitchen module. It will be understood that a privacy-screen function of such a type can also be realized in an aircraft monument that includes merely two first functional modules arranged in the region of portions of the aircraft monument situated substantially opposite one another and also in an aircraft monument wherein pairs of first functional modules are separated from each other by a portion of the centrally arranged further functional module or another functional module.

An aircraft region includes at least one main aisle extending along a longitudinal axis of an aircraft cabin. The at least main aisle may, for example, separate two passenger-seat regions of the aircraft cabin from one another, in which case each passenger-seat region may comprise a plurality of rows of passenger seats arranged one behind the other, each with three passenger seats. The aircraft area may comprise only one main aisle. It is, however, also conceivable to equip the aircraft area with two main aisles which may extend substantially parallel to each other along the longitudinal axis of the aircraft cabin. Furthermore, the aircraft region includes a door aisle which extends substantially perpendicular to the at least main aisle between a first and a second aircraft door. An aircraft monument described above is arranged in the door aisle. By virtue of the arrangement of the aircraft monument in the door aisle, a hitherto unutilized region of the aircraft cabin is utilized for monument installation. The installation space that is utilized in conventional aircraft-cabin layouts for installation of a sanitary module, of a kitchen module and/or of a stowage-compartment module may consequently be utilized otherwise, for example for additional passenger seats.

The aircraft monument preferably is arranged in the door aisle in such a manner that at least one first functional module faces towards a rear region of the aircraft cabin, relative to the flight direction of an aircraft equipped with the aircraft region. Alternatively or in addition to this, the aircraft monument may also be arranged in the door aisle in such a manner that at least one first functional module faces towards a front region of the aircraft cabin, relative to the flight direction of an aircraft equipped with the aircraft region.

The aircraft monument preferably is arranged substantially centrically in the door aisle. Such an arrangement of the aircraft monument enables the aircraft monument to be utilized as part of a guiding system for emergency evacuations. In particular, the aircraft monument may perform a guidance function for persons moving along the main aisle in the direction of the aircraft doors, since the persons are necessarily led along the outer walls of the aircraft monument in the direction of the aircraft doors. In the event of an emergency evacuation of the aircraft, this enables an increase in the door capacity, i.e., an increase in the number of persons who are able to leave the aircraft via the doors of the aircraft per unit of time.

The side wall of the first functional module of the aircraft monument preferably is adapted to serve in its first operational position as a guidance device for passengers moving in the course of disembarking from the aircraft or in the event of an emergency evacuation of the aircraft, for example from the main aisle in the direction of the first and/or the second aircraft door. In particular, the side wall of the first functional module in its first operational position may be dimensioned and shaped in such a way that it leads the passengers in the direction of the aircraft doors. Furthermore, in connection with the fashioning of the side wall of the first functional module in its first operational position, corners or edges that might hinder the movement of the passengers in the direction of the aircraft doors should be dispensed with.

The side wall of the first functional module of the aircraft monument may furthermore be adapted to serve in its second operational position as a privacy screen and/or a separating device between two portions of the aircraft region. In particular, the side wall of the first functional module in its second operational position may be dimensioned in such a manner and arranged in the aircraft region in such a manner that it can serve as a privacy screen and/or a separating device between a front part of the aircraft cabin, with respect to the aircraft monument, and a rear part of the aircraft cabin, with respect to the aircraft monument. The portions of the aircraft region that are separated from one another by the side wall of the first functional module in its second operational position may be, for example, regions of the aircraft cabin assigned of two different classes, for example to an economy class and to a business class.

In a process for operating an aircraft equipped with an aircraft monument described above and/or with an aircraft region described above, the side wall of the first functional module is in its first operational position during take-off, landing and taxiing. As a result, the space requirement of the aircraft monument is minimized, so that the comfort of the passengers when boarding the aircraft or when leaving the aircraft is not restricted. Furthermore, the evacuation paths that are necessary for reasons of safety are kept clear. Lastly, the side wall of the first functional module in its first operational position can serve as a guidance device for passengers moving when disembarking from the aircraft or in the event of an emergency evacuation of the aircraft, for example from the main aisle in the direction of the first and/or the second aircraft door.

During cruise flight the side wall of the first functional module is, on the other hand, in its second operational position. By reason of the enlarged base area of the first functional module, this enables a particularly comfortable utilization of the first functional module. Furthermore, the side wall of the first functional module of the aircraft monument in its second operational position during cruise flight can serve as a privacy screen and/or a separating device between two portions of the aircraft region.

BRIEF DESCRIPTION OF THE DRAWINGS

Preferred embodiments of the invention will now be elucidated in more detail on the basis of the appended schematic drawings, in which FIG. 7 shows a top view of the aircraft region according to FIG. 6, wherein a side wall of the first functional module is in a second operational position.

DETAILED DESCRIPTION OF THE PREFERRED EMBODIMENTS

Figure 1:
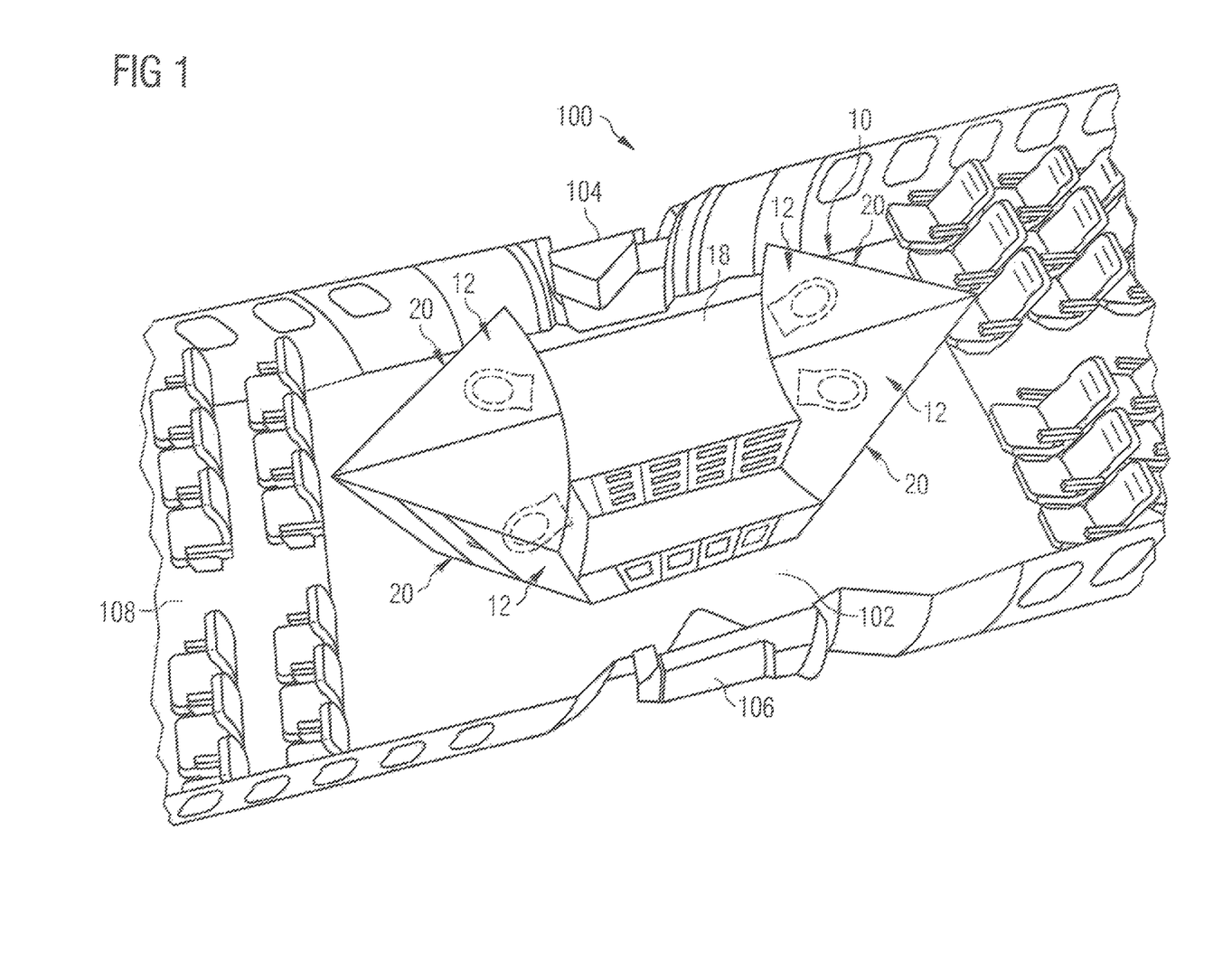
FIG. 1 shows a three-dimensional representation of an aircraft region in which an aircraft monument including a first functional module is arranged, wherein a side wall of the first functional module is in a first operational position.
Figure 2:
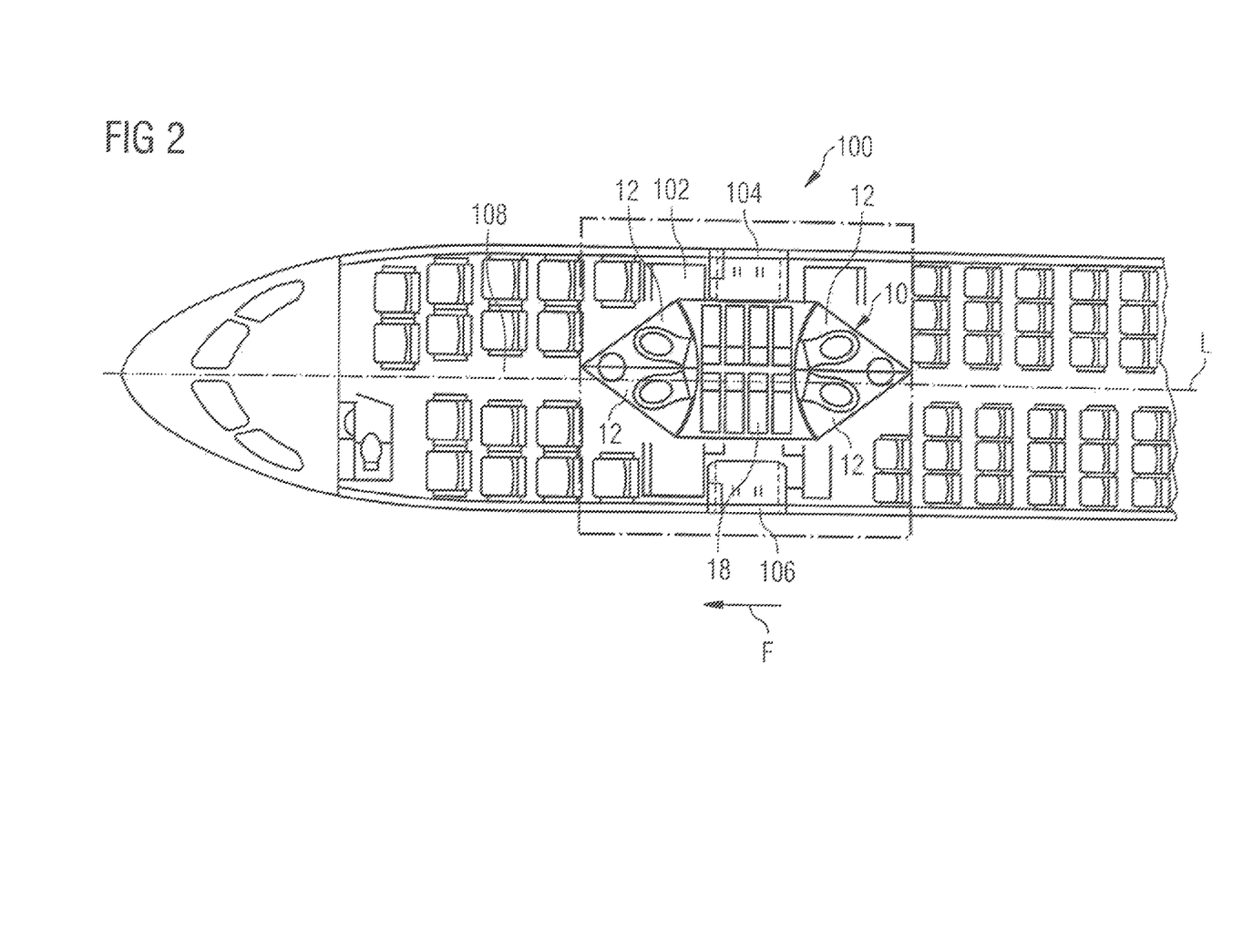
FIG. 2 shows a top view of the aircraft region according to FIG. 1.
Figure 4:
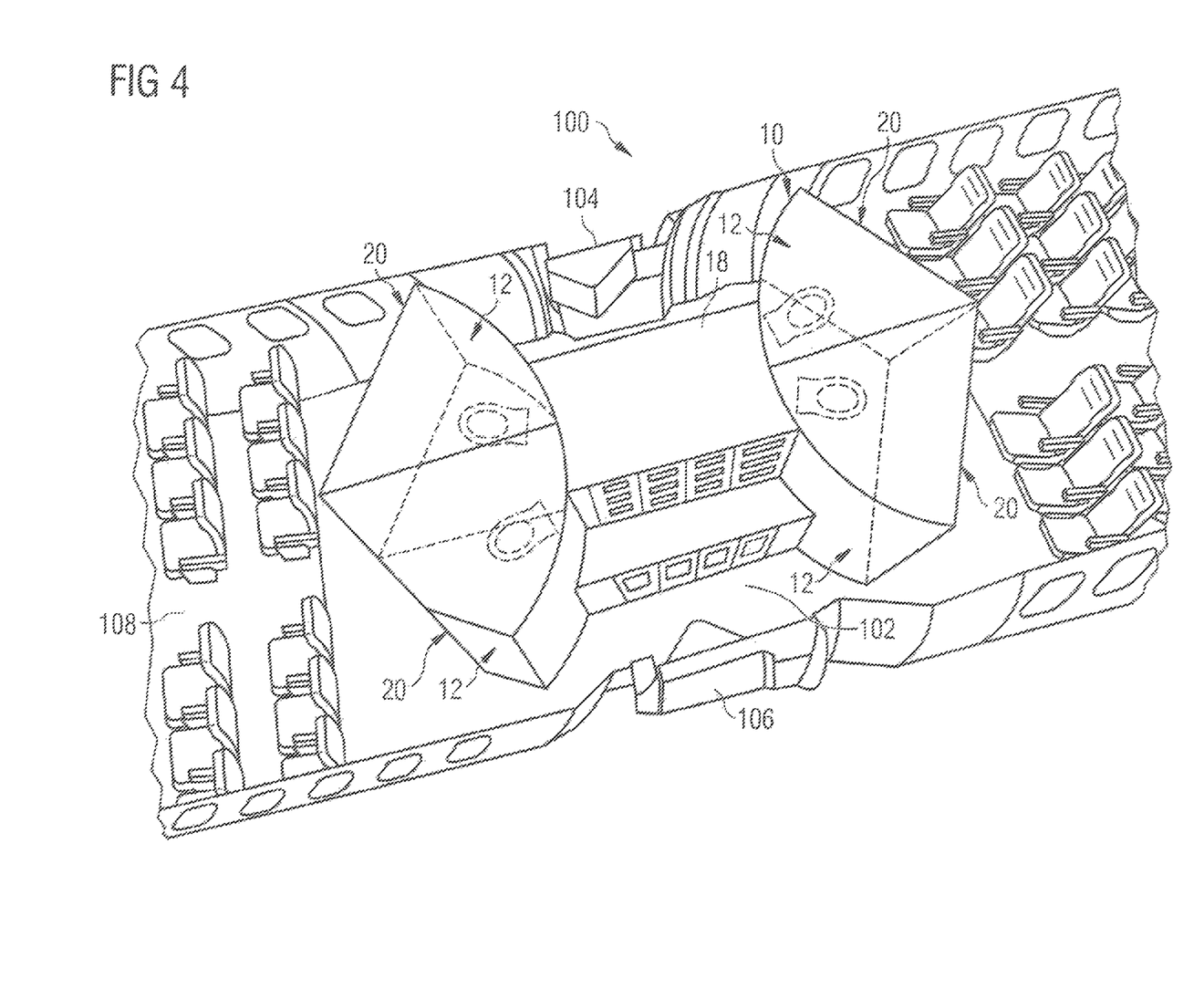
FIG. 4 shows a three-dimensional representation of the aircraft region according to FIG. 1, wherein a side wall of the first functional module is in a second operational position.

FIGS. 1, 2 and 4 each show an aircraft region 100 which is formed by a part of an aircraft cabin. In the aircraft region 100 an aircraft monument 10 is arranged. The aircraft monument 10 includes four first functional modules 12 which are designed in the form of a sanitary module and comprise a toilet 14 and also further sanitary devices, in particular a washbasin 16.

Over and above this, the aircraft monument 10 includes a centrally positioned further functional module 18 designed in the form of a kitchen module, which is adjoined in the direction of a longitudinal axis L of the aircraft cabin in each instance by a pair of first functional modules 12 arranged side by side. In the aircraft monument 10 the two pairs of first functional modules 12 consequently are arranged in the region of portions of the aircraft monument 10 situated substantially opposite one another and be separated from one another by the further functional module 18 constructed in the form of a kitchen module.

Each first functional module 12 includes a side wall 20 which serves to delimit the first functional module 12 from a region of the aircraft cabin adjacent to the first functional module 12 and also from a region of the aircraft monument 10 adjacent to the first functional module 12. The region of the aircraft monument 10 adjacent to the first functional module 12 is formed, in the embodiment of an aircraft monument 10 that is shown, in each instance by a region of the further functional module 18 adjacent to the first functional module 12 and also by the further first functional module 12 adjacent to the first functional module 12.

Figure 3:
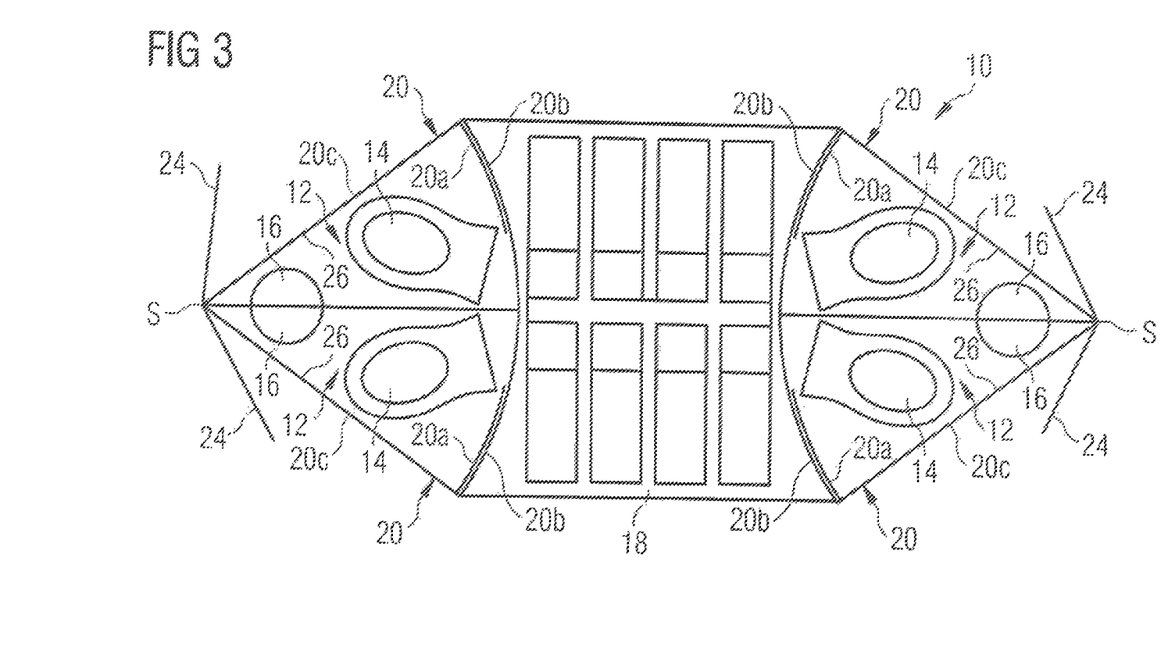
FIG. 3 shows a top view of the aircraft monument provided in the aircraft region according to FIG. 1.
Figure 5:
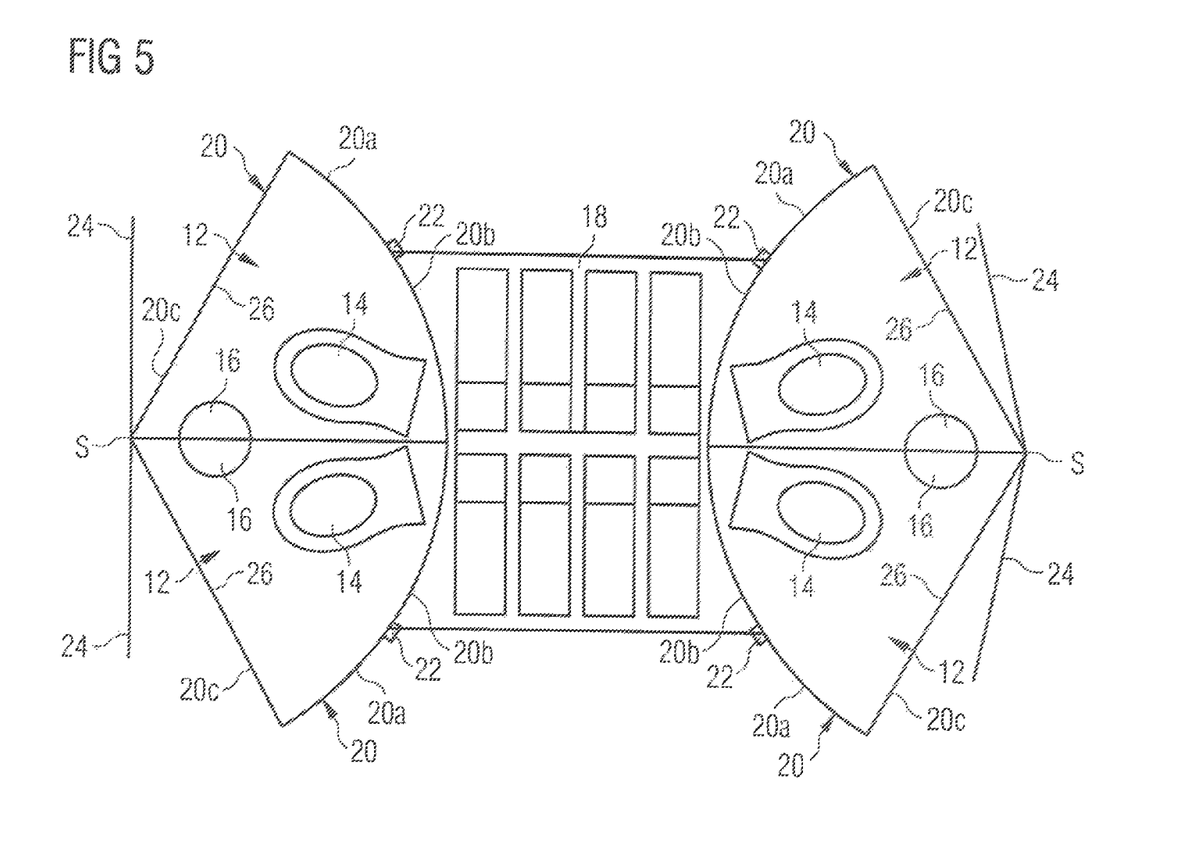
FIG. 5 shows a top view of the aircraft monument provided in the aircraft region according to FIG. 4.

As becomes evident, in particular, from a comparison of FIGS. 1 and 3, respectively 4 and 5, the side wall 20 of each first functional module 12 is movable between a first operational position (see FIGS. 1 and 3) and a second operational position (see FIGS. 4 and 5) and comprises a side-wall region 20*a* which merely in the second operational position of the side wall 20 serves for delimiting the first functional module 12 from the region of the aircraft cabin adjacent to the first functional module 12. If, on the other hand, the side wall 20 is in its first operational position, side-wall region 20*a* is arranged within the first functional module 12. In particular, in the first operational position of the side wall 20 side-wall region 20*a* extends adjacent and parallel to a further side-wall region 20*b* of the side wall 20 of the first functional module 12, which, irrespective of the operational position of the side wall 20, serves for delimiting the first functional module 12 from the further functional module 18.

Each of the first functional modules 12 has, irrespective of the operational position of the side wall 20, a tapering, circular-segment-shaped base area. A movement of the side wall 20 out of its first operational position into its second operational position results, however, in an enlargement of the base area of each first functional module 12. The base areas of the first functional modules 12 are chosen in such a way that the first functional modules 12, each designed in the form of a sanitary module, can be utilized also when the side wall 20 of the first functional modules 12 is in its first operational position. By virtue of the enlarged base area of the first functional modules 12, however, a greater ease of use is obtained if the side walls 24 of the first functional modules 12 are in their second operational position.

Side-wall region 20*a*, which merely in the second operational position of the side wall 24 serves for delimiting the first functional module 12 from a region of the aircraft cabin adjacent to the first functional module 12, is designed in the form of a segment of an outer cylindrical surface. Correspondingly, the further side-wall region 20*b* also is designed in the form of a segment of an outer cylindrical surface. If the side wall 20 of the first functional module 12 is in its second operational position, side-wall region 20*a* serves for expanding the further side-wall region 20*b*, each first functional module 12 being equipped with a connecting arrangement 22, designed for example in the form of a suitable latching arrangement, which serves in the second operational position of the side wall 20 to establish a connection between side-wall region 20*a* and the further side-wall region 20*b* expanded in the second operational position of the side wall 20 by side-wall region 20*a*.

The side wall 20 of each first functional module 12 is movable between its first and its second operational position by swiveling of a portion of the side wall 20 about a swivel axis S. The portion of the side wall 20 that is capable of swiveling about the swivel axis S is formed by side-wall region 20*a* and by a sidewall region 20*c*, close to the swivel axis, adjoining side-wall region 20*a* in the direction of the swivel axis S. Between side-wall region 20*a* and side-wall region 20*c* close to the swivel axis a rigid connection or an articulated connection may be provided. An articulated connection between side-wall region 20*a* and sidewall region 20*c* close to the swivel axis, which can be established, for example, by suitable hinges or such like, facilitates the orientation of side-wall region 20*a* with respect to the further side-wall region 20*b* and the connection of side-wall region 20*a* to the further side-wall region 20*b*.

The swivel axis S is arranged in the region of a vertex of the tapering base area of the first functional module 12, whereby for each pair of first functional modules 12 arranged adjacent to one another in each instance a common swivel axis S is provided. The swivel axis S may be anchored in the region of a floor of the first functional modules 12 and/or in a floor of the aircraft cabin.

In the side wall 20 of each first functional module 12 a doorway 26 that is capable of being closed by a door 24 is formed, in order to make the interior space of the first functional module 12 accessible. In particular, the doorway 26 is provided in each instance in side-wall region 20c, close to the swivel axis, of the first functional modules 12. The doors 24 of each pair of first functional modules 12 arranged adjacent to one another are capable of swiveling between an open position and a closed position about the swivel axis S. The swivel axis S is consequently utilized both for swiveling the corresponding side-wall regions 20a, 20c and for swiveling the doors 24 of two first functional modules 12 arranged adjacent to one another.

The aircraft monument 10 is arranged in the aircraft region 100 centrically in a door aisle 102 which extends between a first and a second aircraft door 104, 106 and substantially perpendicular to a main aisle 108 running along a longitudinal axis L of the aircraft cabin. The door aisle 102 consequently separates a front part of the aircraft cabin from a rear part of the aircraft cabin, viewed in the flight direction F. The aircraft monument 10 arranged centrically in the door aisle 102 is consequently arranged between the front and the rear part of the aircraft cabin, with one pair of first functional modules 12 facing towards the rear part of the aircraft cabin, and one pair of first functional modules 12 facing towards the front part of the aircraft cabin. The vertices of the tapering base areas of the first functional modules 12 are consequently arranged substantially along the longitudinal axis L running centrically through the aircraft cabin.

By virtue of the centric arrangement in the door aisle 102, in the event of an emergency evacuation the aircraft monument 10 performs a guidance function for persons moving along the main aisle 108 in the direction of the aircraft doors 104, 106. In particular, these persons are led along side-wall regions 20c of the first functional modules 12 in the direction of the aircraft doors 104, 106.

Depending on the operating condition of an aircraft equipped with the aircraft monument 10 described above or with the aircraft region 100 described above, the side wall 20 of the first functional modules 12 is in its first or its second operational position. In particular during take-off, landing and taxiing, the side wall 20 of the first functional modules 12 is arranged in its first operational position. The side wall 20 of the first functional module 12 arranged in its first operational position can then serve as a guidance device for passengers moving in the course of disembarking from the aircraft or in the event of an emergency evacuation of the aircraft, for example from the main aisle 108 in the direction of the first and/or the second aircraft door 104, 106.

During cruise flight the side wall 20 of the first functional modules 12 is, on the other hand, in its second operational position. By virtue of the enlarged base area of the first functional module 12, this enables a particularly comfortable utilization of the first functional module 12. Furthermore, the side wall 20 of the first functional module 12 in its second operational position may serve during cruise flight as a privacy screen and/or a separating device between two portions of the aircraft region 100.

Figure 6:
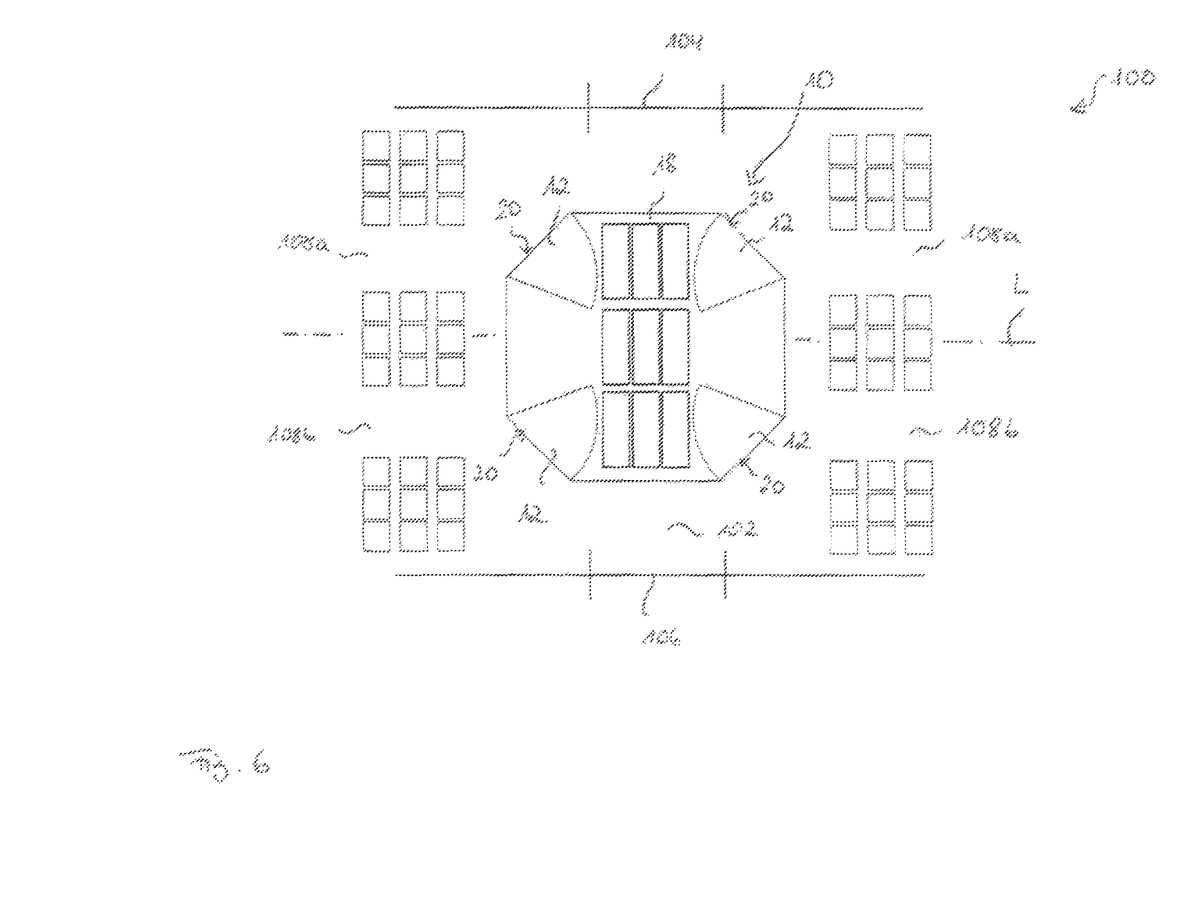
FIG. 6 shows a top view of an alternative aircraft region in which an aircraft monument including a first functional module is arranged, wherein a side wall of the first functional module is in a first operational position.
Figure 9:
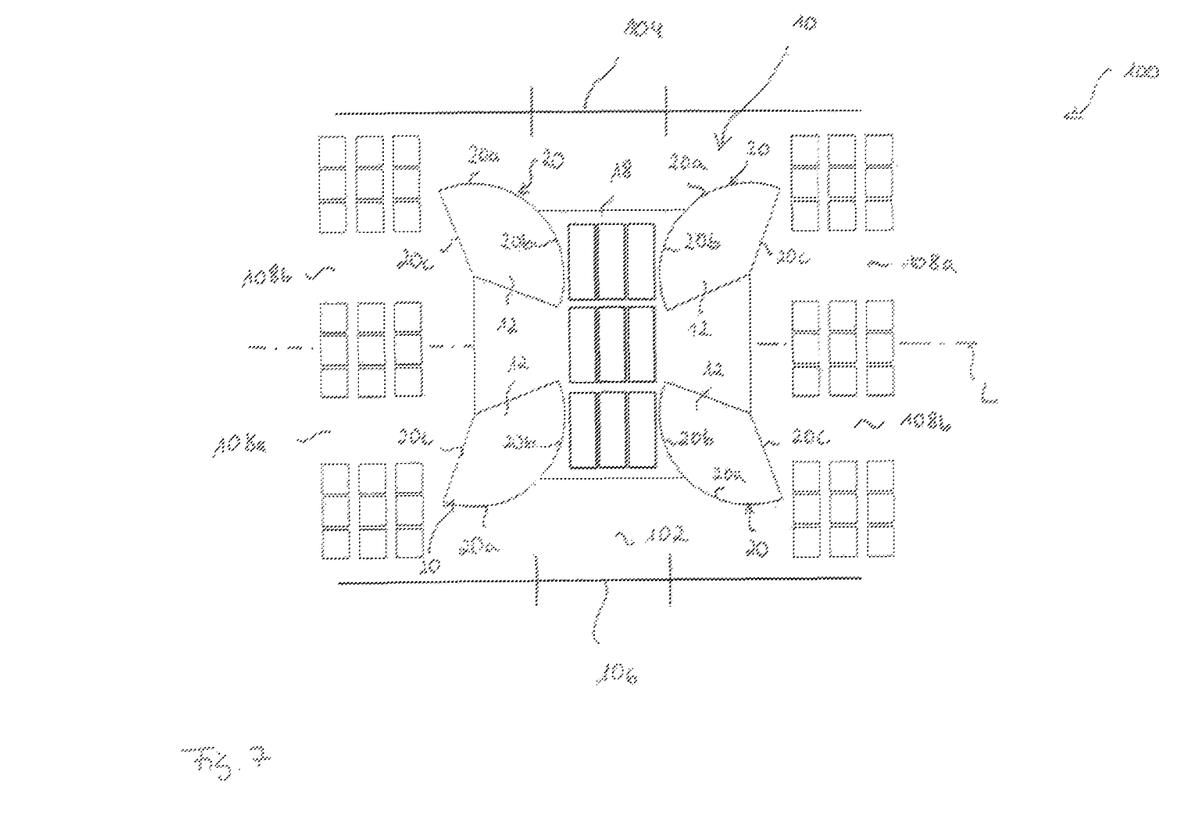

An aircraft area 100 which is illustrated in FIGS. 6 and 7 differs from the arrangement according to FIGS. 4 to 6 through the fact that the aircraft area 100 comprises two main aisles 108a, 108b which extend substantially parallel to each other along the longitudinal axis L of the aircraft cabin. The aircraft monument 10 still comprises two pairs of first functional modules 12 which face towards the rear part and the front part of the aircraft cabin, respectively. The pairs of first functional modules 12, however, are no longer arranged immediately adjacent to each other, but separated from each other by a part of the centrally arranged further functional module 18. Hence, although the aircraft area 100 now comprises two main aisles 108a, 108b, the sidewalls 20 of the first functional modules 12, in their first operational position still serve as a guidance device for guiding passengers moving along the main aisles 108a, 108b in the direction of the aircraft doors 104, 106. In their second operational position, the sidewalls 20 of the first functional modules 12 serve as a privacy screen shielding portions of the centrally arranged further functional module 18 which face the aircraft doors 104, 106. Furthermore, the sidewalls 20 of the first functional modules 12, in their second operational position, act as a separating device between the rear part and the front part of the aircraft cabin.

In other respects, the structure and functioning of the aircraft monument 10 and the aircraft area 100 according to FIGS. 6 and 7 correspond to the structure and functioning of the arrangement according to FIGS. 1 to 5.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft region, comprising:
   at least one main aisle extending along a longitudinal axis of an aircraft cabin,
   a door aisle extending substantially perpendicular to the at least one main aisle between a first and a second aircraft door, and
   an aircraft monument arranged in the door aisle comprising a first functional module,
   the first functional module including a side wall for delimiting the first functional module from at least one of a region of the aircraft cabin adjacent to the first functional module and a region of the aircraft monument adjacent to the first functional module,
   the side wall being movable between a first and a second operational position and comprises a side-wall region which merely in the second operational position of the side wall serves for delimiting the first functional module from a region of the aircraft cabin adjacent to the first functional module, so that a movement of the side wall out of its first operational position into its second operational position results in an enlargement of a base area of the first functional module,
   wherein the side wall of the first functional module is adapted to serve in its first operational position as a guidance device for passengers moving in the course of disembarking from the aircraft, or in the event of an emergency evacuation of the aircraft in the direction of at least one of the first and the second aircraft door.

2. The aircraft region according to claim 1, wherein the aircraft monument is arranged in the door aisle in such a manner that the side wall of the first functional module faces towards a rear region of the aircraft cabin, relative to the flight direction of an aircraft equipped with the aircraft region.

3. The aircraft region according to claim 1, wherein the aircraft monument is arranged in the door aisle in such a manner that the side wall of the first functional module faces towards a front region of the aircraft cabin, relative to the flight direction of an aircraft equipped with the aircraft region.

4. The aircraft region according to claim 1, wherein the aircraft monument is arranged substantially centrically in the door aisle.

5. The aircraft region according to claim 1, wherein the side wall of the first functional module is adapted to serve in its second operational position as at least one of a privacy screen and a separating device between two portions of the aircraft region.

6. The aircraft region according to claim 1, wherein the first functional module of the aircraft monument is configured in the form of a sanitary module.

7. The aircraft region according to claim 1, wherein the first functional module of the aircraft monument comprises a tapering base area, in particular a circular-segment-shaped base area.

8. The aircraft region according to claim 7, wherein in the side wall of the first functional module of the aircraft monument a doorway that is capable of being closed by a door is formed, the door being capable of being swiveled between an open position and a closed position about a swivel axis.

9. The aircraft region according to claim 8, wherein the swivel axis is arranged in the region of a vertex of the tapering base area of the first functional module of the aircraft monument.

10. The aircraft region according to claim 1, wherein the side wall of the first functional module of the aircraft monument is movable between its first and its second operational position by swiveling of at least one portion of the side wall about a swivel axis.

11. The aircraft region according to claim 10, wherein the swivel axis is arranged in the region of a vertex of the tapering base area of the first functional module of the aircraft monument.

12. The Aircraft region according to claim 1, wherein the side-wall region of the side wall of the first functional module of the aircraft monument, which merely in the second operational position of the side wall serves for delimiting the first functional module from a region of the aircraft cabin adjacent to the first functional module, is designed in the form of a segment of an outer cylindrical surface.

13. The aircraft region according to claim 1, wherein the side-wall region of the side wall of the first functional module of the aircraft monument, which merely in the second operational position of the side wall serves for delimiting the first functional module from a region of the aircraft cabin adjacent to the first functional module, in the first operational position of the side wall is arranged adjacent to a further side-wall region of the side wall of the first functional module in an interior space of the first functional module or outside the first functional module.

14. The aircraft region according to claim 13, wherein at least two first functional modules are arranged in the region of portions of the aircraft monument situated substantially opposite one another.

15. The aircraft region according to claim 1, wherein the aircraft monument includes at least one of a plurality of first functional modules and at least one further functional module serving for a function different from that of the first functional module.

16. The aircraft region according to claim 15, wherein the at least two first functional modules are separated from one another by a further functional module.

* * * * *